United States Patent [19]
Abel

[11] 3,811,749
[45] May 21, 1974

[54] WIDE FIELD REFLECTIVE OPTICAL APPARATUS

[75] Inventor: Irving R. Abel, Lexington, Mass.

[73] Assignee: Honeywell, Inc., Minneapolis, Minn.

[22] Filed: Oct. 12, 1972

[21] Appl. No.: 297,028

[52] U.S. Cl. ................. 350/55, 350/200, 350/294
[51] Int. Cl. ............................................ G02b 17/00
[58] Field of Search ...................... 350/55, 200, 294

[56] References Cited
UNITED STATES PATENTS
2,860,557  11/1958  Moore et al. .................... 350/55 X
3,674,334  7/1972  Offner .............................. 350/55

*Primary Examiner*—David H. Rubin
*Attorney, Agent, or Firm*—Molinare, Allegretti, Newitt & Witcoff

[57] ABSTRACT

The disclosure describes a wide field reflective optical system comprising an afocal fore telescope and an imaging system. The afocal telescope comprises first and second confocal paraboloidal reflectors, an aperture stop located in front of the first reflector at a distance equal to its focal length, and a field stop located at the common focal point of the reflectors. The imaging system is an improvement of the Schmidt principle and comprises an aspheric corrector reflector that reflects radiation from the second paraboloidal reflector onto a plane reflector. The plane reflector is located in front of a spherical reflector that focuses radiation at its focal plane through an aperture in the plane reflector.

16 Claims, 5 Drawing Figures

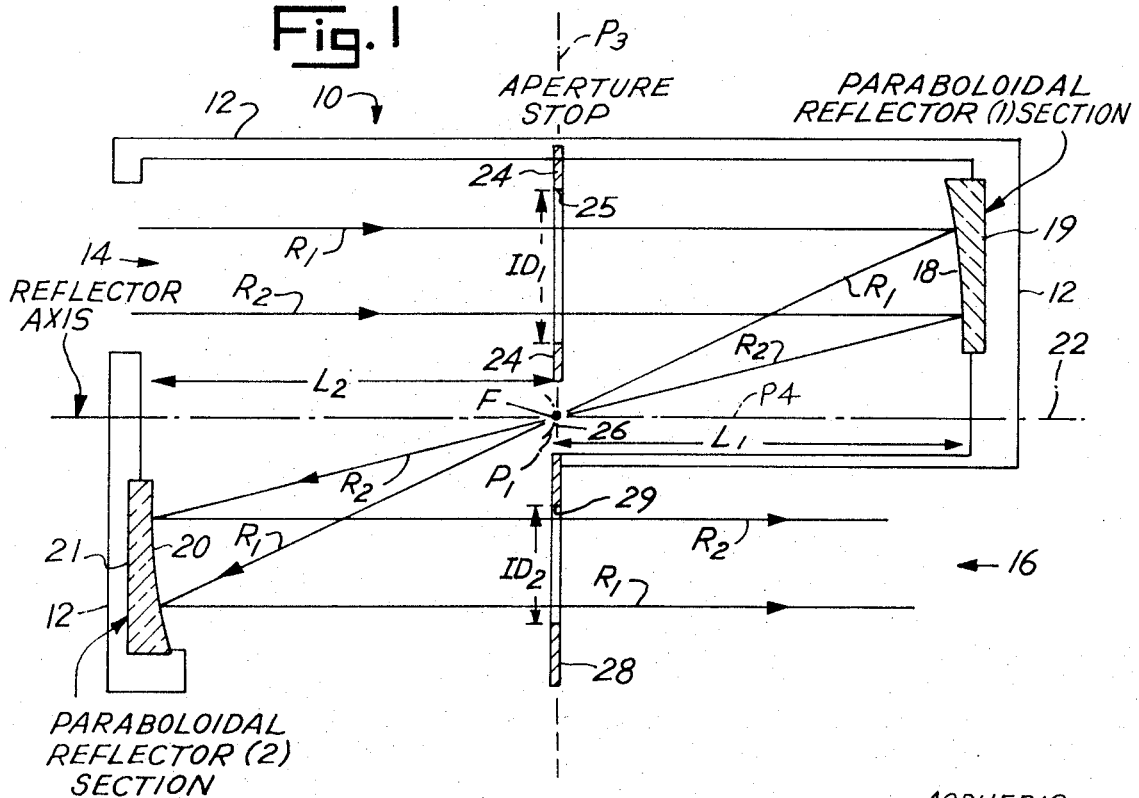
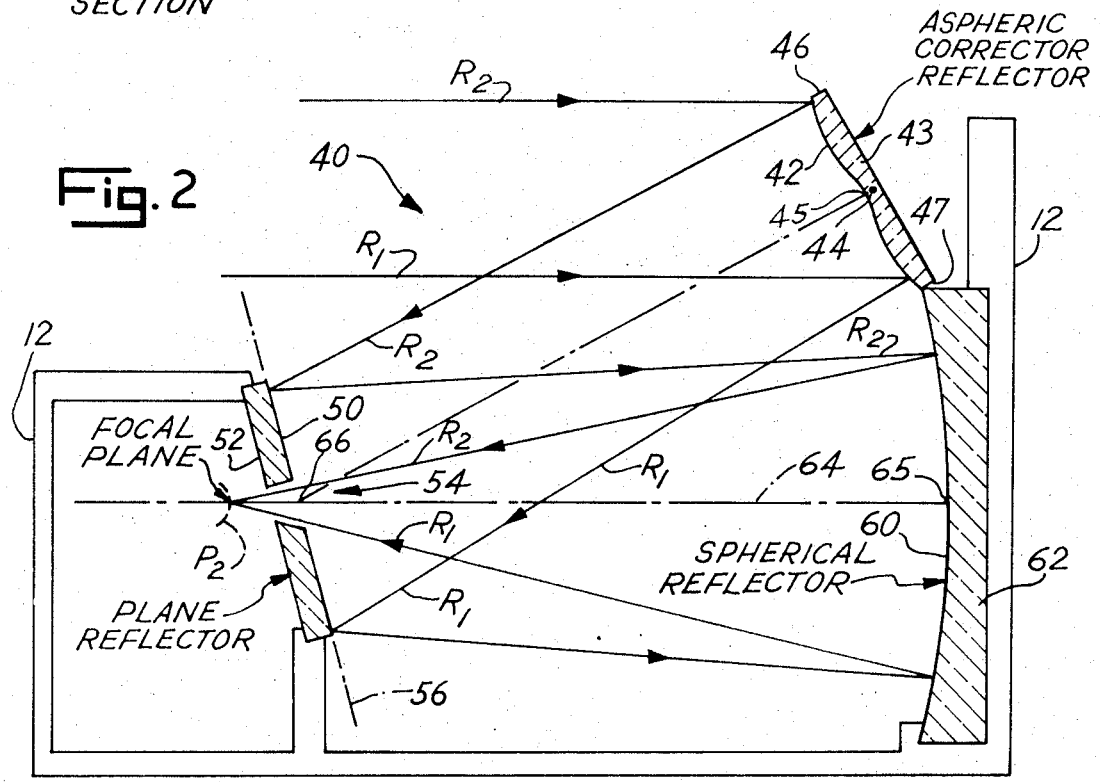

WIDE FIELD REFLECTIVE OPTICAL APPARATUS

BACKGROUND OF THE INVENTION

This invention relates generally to the field of optical instruments, and more particularly relates to reflective telescopic and imaging systems. Such instruments are used, for example, in earth resources surveys made from high altitude vehicles and satellites using radiation in the ultra-violet, visible, and infrared bands of wavelengths.

In order to be useful, such surveys must cover a relatively wide field of view in at least one direction with relatively high resolution. In such a system, the vehicle is moved in a direction perpendicular to the direction of wide-field view in order to cover an area to be observed. Alternatively, a scan mirror within the vehicle may be used to achieve similar results.

In satellite systems, monochromatic defects must be minimized and chromatic aberrations must be avoided. Moreover, such systems must have broad spectrum coverage and image quality independent of wavelength. The entire system must be well suited to extreme environmental conditions, such as mechanical shock, thermal expansion and humidity. The optical system also must exhibit low scattering of incident radiation and must eliminate diffracted radiation from points outside of the field of view, which is important for background discrimination. This combination of restraints presents a very difficult overall problem which the present invention was designed to solve.

SUMMARY OF THE INVENTION

A principal object of the invention is to provide an improved wide field optical system. Another principal object of the invention is to provide an improved wide angle reflective optical system. Other objects of the invention are to provide an afocal telescope which automatically corrects for spherical aberration, coma, and astigmatism by use of reflective elements only. Still another principal object of the invention is to provide an afocal telescope which enables the use of a Lyot stop to reduce the diffracted radiation transmitted through the telescope from points outside of the field of view.

Yet another principal object of the invention is to provide an optical system having the foregoing properties which employs only reflective elements and is capable of covering a wide field in at least one dimension.

A more detailed object of the invention is to provide an afocal telescope capable of covering a wide field by means of two confocal paraboloidal reflectors. Another detailed object of the invention is to provide a wide field imaging system in which an aspheric corrector reflector is used to correct the spherical aberration of a spherical mirror. Another object is to locate the corrector reflector at the center of curvature of the spherical mirror in order to eliminate coma, astigmatism and distortion.

Various other objects, advantages and features of novelty which characterize the invention are pointed out with particularity in the claims annexed hereto and forming a part hereof. However, for better understanding of the invention, its advantages and objects obtained by its use, reference should be made to the drawings which form a further part hereof, and to the accompanying descriptive matter in which there are illustrated and described certain preferred embodiments of the invention.

BRIEF DESCRIPTION OF THE DRAWINGS

FIG. 1 is a schematic, cross sectional view of a preferred form of an afocal telescope made in accordance with the present invention;

FIG. 2 is a schematic, cross sectional view of a preferred form of reflective imaging system made in accordance with the present invention;

In the drawings, like numbers refer to like parts throughout.

DESCRIPTION OF THE PREFERRED EMBODIMENT

Figure 3:
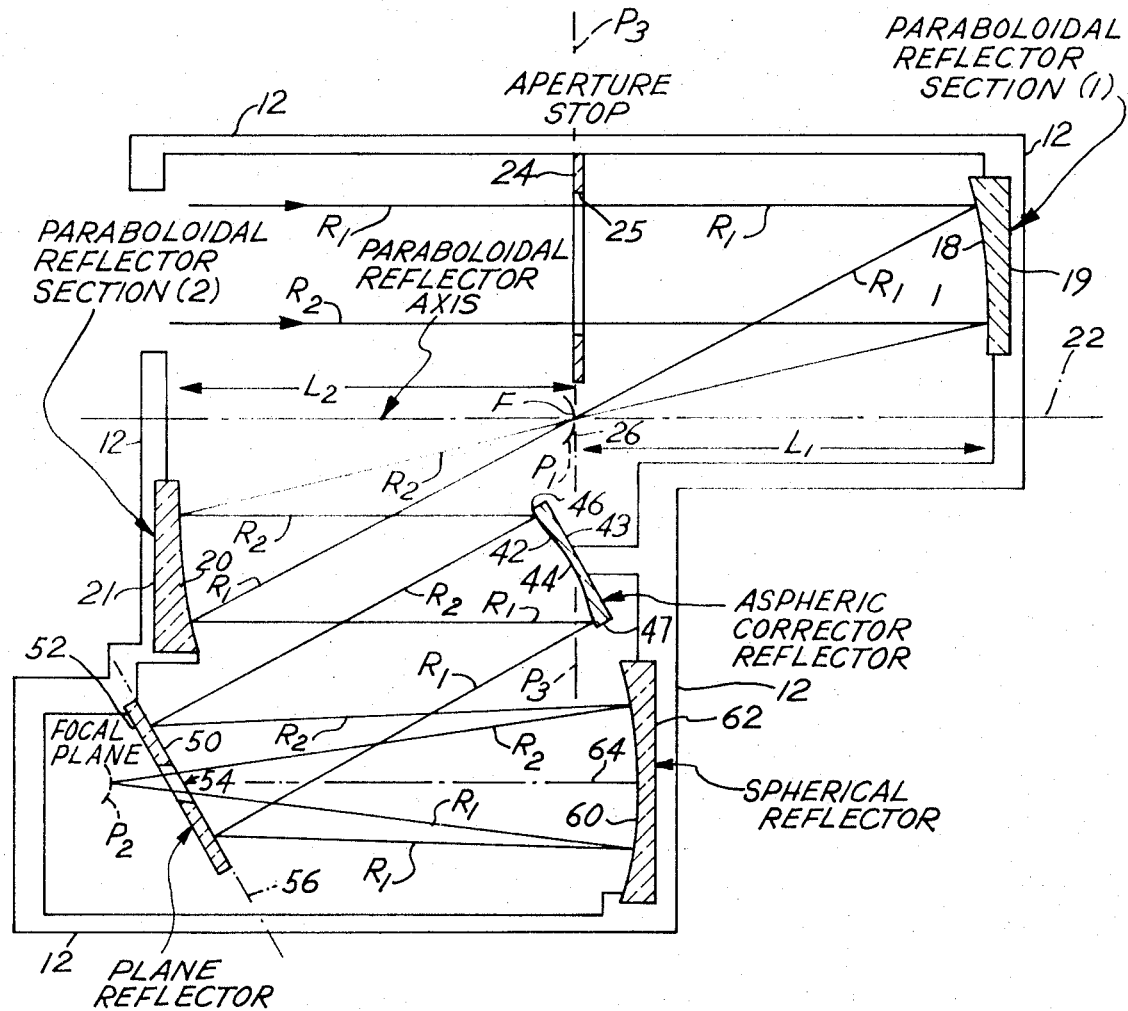
FIG. 3 is a schematic, cross sectional view of a preferred form of optical system including the afocal telescope and reflective imaging system shown in FIGS. 1 and 2.

FIG. 1 schematically illustrates a preferred form of afocal telescope 10 made in accordance with the present invention. The telescope comprises a housing 12 that defines an entrance aperture 14 and an exit area 16.

The afocal telescope also comprises paraboloidal reflectors 18 and 20 that are integrally formed with corresponding bodies 19 and 21, respectively. Reflectors 18 and 20 share a common optical axis 22, a common focal point F, and have equal focal lengths L1 and L2, respectively. The reflectors preferably comprise sections cut from a single paraboloidal reflector, and reflector 18 should have a very low scatter finish.

Radiation received by reflector 18 through aperture 14 is reflected onto a focal plane P1. The locus of points comprising focal plane P1 generate a section of a sphere centered on axis 22 schematically shown in FIG. 1.

An aperture stop 24 having a circular opening 25 with an inside diameter ID 1 is supported by housing 12 at a distance L1 from reflector 18. Stop 24 lies in a plane P3 that is perpendicular to axis 22 and passes through focal point F.

A field stop 26 comprises a spherical or cylindrical surface lying in focal plane P1 of reflector 18 and having a radius of curvature equal to L1 or L2. Field stop 26 also defines a rectangular slit 27 (FIGS. 4 and 5) through which radiation reflected from reflector 18 may pass. The long dimension or length of slit 27 defines a longitudinal midline L3 that lies in a plane P4 perpendicular to plane P3. Plane P4 passes through focal point F in at least one point. The width of slit 27 is small compared with the length and varies depending on the resolution of paraboloidal reflector 18.

A Lyot stop 28 defining a circular opening 29 is supported by housing 12 at a distance L2 from reflector 20. Opening 29 has an inside diameter ID 2 that is less than inside diameter ID 1. As a result, radiation from outside the field of view is diffracted by opening 25, and falls outside of opening 29, whereas radiation from the center of the field of view, such as rays R1 and R2, is allowed to pass through stop 28.

Applicant has discovered that by using an afocal telescope of the above-described type, it is possible to achieve excellent correction of aberrations over a wide field with only two paraboloidal reflectors. The use of two paraboloidal reflectors is an important feature, because spherical aberration is corrected by these reflectors when imaging a distant object. However, by using paraboloidal reflectors 18 and 20 face-to-face so that reflector 18 images at its focal plane P1 and reflector 20 recollimates, the comas of each of reflectors 18 and 20 cancel each other. Applicant has also discovered that by placing aperture stop 24 at a distance in front of reflector 18 equal to its focal length L1, thereby creating an image at a distance from reflector 20 equal to its focal length L2, the astigmatism contribution of reflectors 18 and 20 is each zero. Since spherical aberration, coma, and astigmatism are reduced to zero, except for higher order effects which are significant only at extreme field coverage, applicant's afocal telescope is suitable for wide field coverage.

Applicant has also discovered that his afocal telescope is advantageous because it provides a focal plane P1 for the introduction of field stop 26 which obscures nearby intense source images and allows the use of a Lyot stop 28 to reduce significantly the diffracted radiation from such images transmitted through the telescope. Applicant has found that this reduction in stray radiation is very important in applications requiring the detection of small radiative targets close to large radiative areas.

In the particular embodiment shown herein, field stop 26 takes the form of a slit for reasons discussed hereafter in connection with the imaging system shown in FIG. 2. However, those skilled in the art will recognize that other shapes of field stops could be used depending on the shape of the detector configuration employed in an imaging system associated with the telescope. The exact shape of the field stop is also influenced by the aberrations of reflector 18.

Figure 4:
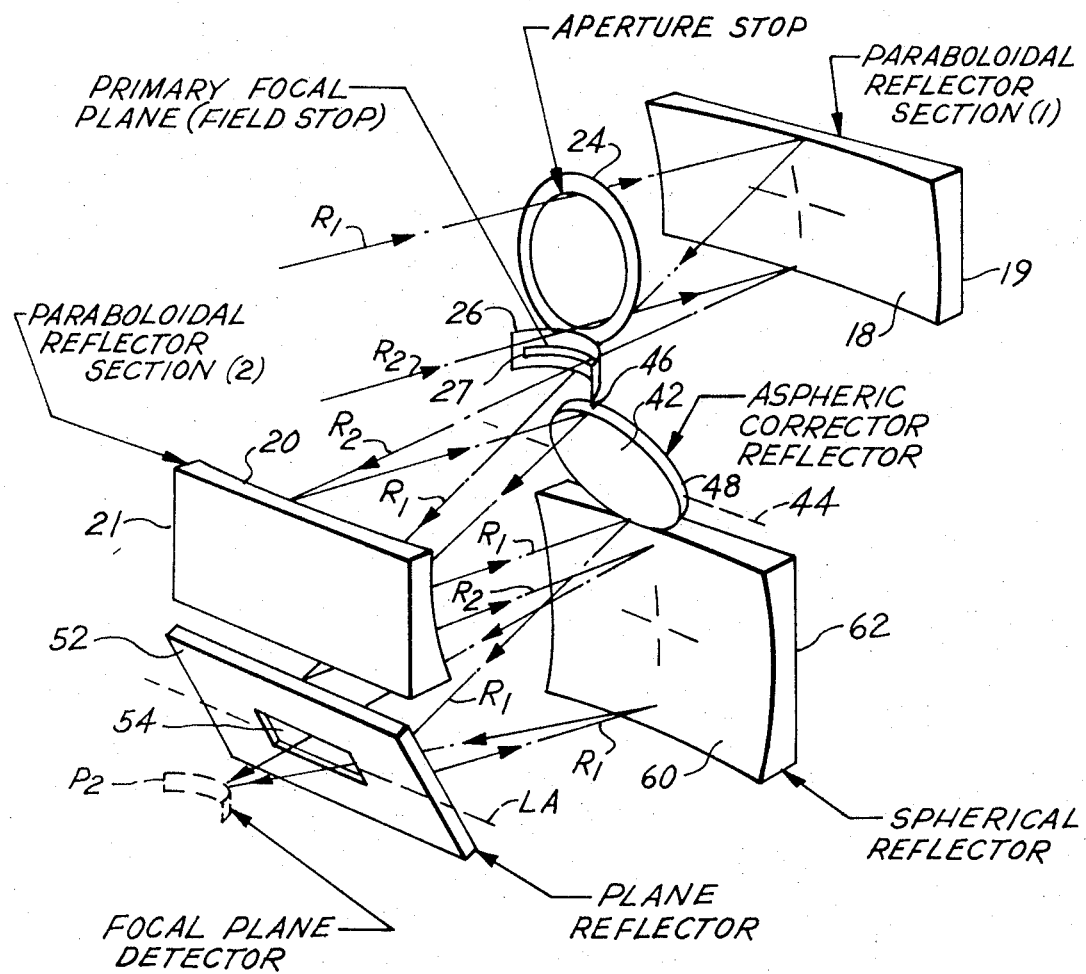
FIG. 4 is an isometric view of the optical system shown in FIG. 3.
Figure 5:
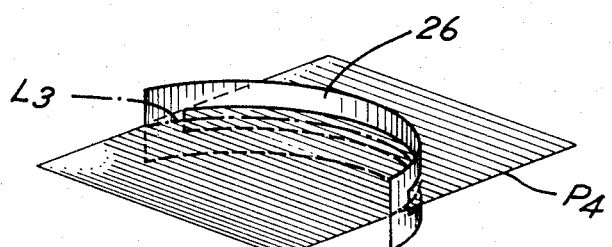
FIG. 5 is an enlarged isometric view of the field stop shown in FIG. 4.

FIG. 2 schematically shows a preferred form of imaging system 40 made in accordance with the present invention. The imaging system comprises a housing 12 that could be an extension of the like-numbered housing shown in FIG. 1. Housing 12 supports an aspheric corrector reflector 42 that is integrally formed with a body 43. Reflector 42 has an upper edge 46 and a lower edge 47 that lie on a circular perimeter 48 (FIG. 4). Body 43 is supported by and can be tilted around an axis of rotation 44.

Imaging system 40 also comprises a plane reflector 50 integrally fabricated with a body 52 that defines an aperture 54 through which radiation may pass. The aperture is a rectangular slit having a longitudinal axis LA parallel to axis 44 (FIG. 4). Reflector 50 defines a plane 56 that is perpendicular to the surface of the paper forming FIG. 2.

Imaging system 40 also comprises a spherical reflector 60 that is integrally formed with a body 62. Reflector 60 is centered around an optical axis 64 that is perpendicular to axis of rotation 44. Radiation reflected from plane reflector 50 onto spherical reflector 60 is focused onto a focal plane P2 through aperture 54. The locus of points comprising focal plane P2 generates a section of a sphere having its center on optical axis 64.

Applicant has found that aspheric corrector reflector 42 corrects for the spherical aberration inherent in reflector 60 without the disadvantages of a refractive Schmidt-type corrector lens. As shown in FIG. 2, radiation is reflected from aspheric corrector reflector 42 onto plane reflector 50. The radiation is then reflected from reflector 50 onto spherical reflector 60 which focuses the radiation through aperture 54 onto plane P2. Reflector 50 is tilted and reflector 60 is positioned so that the center of reflector 42 lies effectively at the center of curvature of reflector 60. That is, the sum of the lengths of line segments 65, 66 and 66, 45 is equal to the radius of curvature of spherical reflector 60. As a consequence, coma, astigmatism and distortion are corrected.

Although the above-described imaging system covers a wide field in two dimensions, applicant has found that it is particularly noteworthy in its ability to cover a substantially wider field in a direction parallel to the axis of rotation 44 of reflector 42.

Applicant has discovered that the afocal telescope, schematically shown in FIG. 1, and the imaging system, schematically shown in FIG. 2, may be combined to form a complete wide field reflective optical system shown schematically in FIGS. 3 and 4. The structure of the system shown in FIGS. 3 and 4 is obvious from the previous description of FIGS. 1 and 2. However, field stop 26 should employ the slit previously described in order to cover a wide field in a direction parallel to axis of rotation 44, and to maximize the rejection of stray or unwanted radiation. When slit field stop 26 is employed, aperture 54 in plane reflector 50 should be shaped in a corresponding manner in order to maximize the energy radiated to spherical reflector 60. That is, the long dimensions, or longitudinal axes, of slits 27 and 54 should lie in planes parallel to axis 44.

In addition, it should be noted that axis of rotation 44 is located at a distance from reflector 20 equal to its focal length L2. As a result, reflector 42 acts as a Lyot stop if the boundary of the reflector defined by edges 46 and 47 is somewhat smaller than the image of aperture stop opening 25.

The entire optical system described herein employs only reflective elements. Applicant has found that this feature provides broad spectrum coverage and image quality independent of wavelength. Moreover, all reflective systems enable the use of efficient coating materials covering the spectrum from the ultraviolet through the far infrared region with small energy loss. The reflective elements described herein can be fabricated from substrate materials well suited to extreme environmental conditions of mechanical shock, thermal-expansion, and humidity. In addition, such elements exhibit low scattering of incident radiation which is important for adequate background discrimination.

In one preferred embodiment contemplated by the applicant, the focal lengths of reflectors 18 and 20 (i.e., L1 and L2) equal 20 inches each, the radius of curvature of spherical reflector 60 equals 40 inches, the effective aperture diameter is 8 inches, the $f$ number is 2.5, the field stop slit length is about 3.5 inches and the field stop slit width is on the order of one-eighth inch, depending on the resolution of the first paraboloidal reflector 18. Aspheric corrector reflector 42 is defined by the equation $S = Dy^4 + Ey^6 + Fy^8 + Gy^{10}$ where S equals displacement along a direction normal to the plane surface of reflector 42 before it is ground, and where $D = 1.95313 \times 10^{-6}$, $E = 1.83106 \times 10^{-9}$, $F = 2.14531 \times 10^{-12}$, and $G = 2.85495 \times 10^{-15}$.

Numerous objects and advantages of applicant's invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention. For example, L1 and L2 need not be equal. In particular, if L2 is smaller than L1, the optics after reflector 18 can be made dimensionally smaller at the expense of a larger field angle of the imaging system.

What is claimed is:

1. A wide field reflective optical system comprising:

an aperture stop;
   a field stop;
   a first paraboloidal reflector having a first focal point and a first optical axis for receiving radiation through the aperture stop;
   a second paraboloidal reflector having a second focal point and a second optical axis for receiving radiation reflected from the first paraboloidal reflector;

first means for positioning the first and second paraboloidal reflectors so that the first and second focal points are substantially coincident;
   second means for positioning the aperture stop at a predetermined distance from the first paraboloidal reflector;
   third means for positioning the field stop substantially at the first and second focal points;
   a spherical reflector having a focal plane;
   aspheric reflector means for reflecting radiation received from the second paraboloidal reflector into the spherical reflector in order to correct optical aberrations of the spherical reflector, whereby an image of at least part of the radiation transmitted through the aperture stop is formed on the focal plane.

2. Apparatus, as claimed in claim 1, wherein the first paraboloidal reflector and the second paraboloidal reflector are sections of a single paraboloidal reflector.

3. Apparatus, as claimed in claim 1, wherein the first and the second optical axes are colinear.

4. Apparatus, as claimed in claim 1, wherein the first and second paraboloidal reflectors lie on opposite sides of a plane perpendicular to the optical axis, said plane also passing through the first and second focal points.

5. Apparatus, as claimed in claim 1, wherein the predetermined distance is substantially equal to the focal length of the first paraboloidal reflector.

6. Apparatus, as claimed in claim 1, wherein the field stop is located substantially at the first and second focal points.

7. Apparatus, as claimed in claim 1, wherein the field stop comprises a slit.

8. Apparatus, as claimed in claim 1, wherein the aspheric reflector means comprises:
   an aspheric reflector tilted around an axis of rotation for reflecting radiation received from the second paraboloidal reflector; and
   a plane reflector for reflecting radiation received from the aspheric reflector onto the spherical reflector.

9. Apparatus, as claimed in claim 8, wherein the axis of rotation is located at a distance from the second paraboloidal reflector substantially equal to the focal length of the second paraboloidal reflector.

10. Apparatus, as claimed in claim 9, wherein the aspheric reflector is positioned so that a portion of the radiation reflected from the second paraboloidal reflector is not reflected by the aspheric reflector, whereby the aspheric reflector acts as a Lyot stop.

11. Apparatus, as claimed in claim 8, wherein the field stop is a slit having a longitudinal midline that defines a plane parallel to the axis of rotation of the aspheric reflector.

12. Apparatus, as claimed in claim 11, wherein the field stop defines a spherical surface and wherein the slit comprises a segment of the spherical surface.

13. Apparatus, as claimed in claim 8, wherein the plane reflector defines a plane that intersects the optical axis of the spherical reflector at a predetermined point and wherein the sum of the length of the optical axis between the spherical reflector and said point and the distance between said point and the center of the aspheric reflector equals the radius of the spherical reflector.

14. Apparatus, as claimed in claim 8, wherein the plane reflector defines a plane that lies between the focal plane of the spherical reflector and the surface of the spherical reflector.

15. Apparatus, as claimed in claim 14, wherein the plane reflector defines an aperture through which light reflected from the spherical reflector is transmitted to the focal plane.

16. Apparatus, as claimed in claim 15, wherein the aperture comprises a slit having a longitudinal axis that extends in a direction parallel to the axis of rotation of the aspheric reflector.

* * * * *